(12) United States Patent
Poloni et al.

(10) Patent No.: US 8,459,083 B2
(45) Date of Patent: Jun. 11, 2013

(54) GUIDING SYSTEM FOR A METAL STRIP AT A ROLLING MILL OUTLET

(75) Inventors: Alfredo Poloni, Fogliano Redipuglia (IT); Luciano Vignolo, Udine (IT); Luca Sandrin, Terzo di Aquileia (IT); Fabio Vecchiet, Cervignano Del Friuli (IT); Matteo Nobile, Ruda (IT)

(73) Assignee: Danieli & C. Officine Meccaniche S.p.A. (IT)

( * ) Notice: Subject to any disclaimer, the term of this patent is extended or adjusted under 35 U.S.C. 154(b) by 665 days.

(21) Appl. No.: 12/450,845

(22) PCT Filed: Apr. 17, 2008

(86) PCT No.: PCT/IB2008/000941
§ 371 (c)(1),
(2), (4) Date: Oct. 15, 2009

(87) PCT Pub. No.: WO2008/129393
PCT Pub. Date: Oct. 30, 2008

(65) Prior Publication Data
US 2010/0101294 A1 Apr. 29, 2010

(30) Foreign Application Priority Data
Apr. 20, 2007 (IT) .............................. RM2007A0233

(51) Int. Cl.
*B21B 39/20* (2006.01)
(52) U.S. Cl.
USPC .................... 72/250; 72/201; 72/227; 72/251

(58) Field of Classification Search
USPC .................. 72/160, 197, 201, 203, 205, 227, 72/234, 250, 251, 38, 236
See application file for complete search history.

(56) References Cited

U.S. PATENT DOCUMENTS

| | | | | |
|---|---|---|---|---|
| 671,991 A * | 4/1901 | Diescher | | 72/251 |
| 1,054,748 A * | 3/1913 | Cook | | 72/251 |
| 1,554,551 A * | 9/1925 | Biggert, Jr. et al. | | 72/251 |
| 1,799,508 A * | 4/1931 | George | | 72/251 |
| 1,937,194 A * | 11/1933 | Fisk | | 72/204 |
| 3,151,197 A * | 9/1964 | Schultz | | 266/102 |
| 3,230,752 A * | 1/1966 | Dobson et al. | | 72/202 |
| 3,420,083 A * | 1/1969 | Loveless et al. | | 72/201 |
| 3,559,438 A * | 2/1971 | Rouyer et al. | | 72/160 |

(Continued)

FOREIGN PATENT DOCUMENTS
CN 1411922 4/2003
DE 44 05 352 A1 8/1995
(Continued)

*Primary Examiner* — Edward Tolan
(74) *Attorney, Agent, or Firm* — Stetina Brunda Garred & Brucker (57) ABSTRACT

A roller guiding system for thin strips (20) at a rolling system outlet which allows a safe guiding without take-off and consequent tipping/folding of the head of the strip and without cobbles even at high feeding speeds. The system of the invention prevents the strip from impacting or sliding on the upper containment devices (8) or on the rollers (4') by its upwards or downwards movement, thus avoiding possible damages to the surface, such as scratches or lines. Furthermore, such a guiding system acts on the mechanical-aerodynamic phenomenon which causes instability in the head moving by making a self-centering guiding system which is thus suitable for improving the winding quality of the coil itself.

15 Claims, 6 Drawing Sheets

U.S. PATENT DOCUMENTS

| | | | |
|---|---|---|---|
| 3,913,369 A * | 10/1975 | Field et al. | 72/251 |
| 4,002,047 A * | 1/1977 | MacPhee et al. | 72/160 |
| 4,013,284 A * | 3/1977 | Demetre | 271/183 |
| 4,056,959 A * | 11/1977 | Ward | 72/128 |
| 4,086,689 A | 5/1978 | Martt | |
| 4,334,421 A * | 6/1982 | Ostlinning et al. | 72/257 |
| 4,528,830 A * | 7/1985 | Masui et al. | 72/11.7 |
| 5,069,158 A * | 12/1991 | Rey | 118/410 |
| 5,701,775 A * | 12/1997 | Sivilotti et al. | 72/201 |
| 5,779,184 A * | 7/1998 | Kaufmann et al. | 242/554.2 |
| 6,185,971 B1 * | 2/2001 | Kuwano et al. | 72/205 |
| 6,761,053 B2 * | 7/2004 | Tazoe | 72/184 |
| 2003/0070466 A1 | 4/2003 | Horii et al. | |

FOREIGN PATENT DOCUMENTS

| | | |
|---|---|---|
| DE | 198 09 444 A1 | 9/1999 |
| DE | 198 41 839 A1 | 3/2000 |
| JP | 61-95708 | 5/1986 |
| JP | 63-76712 * | 4/1988 |
| JP | 1-148412 * | 6/1989 |
| JP | 05-185128 | 7/1993 |

* cited by examiner

GUIDING SYSTEM FOR A METAL STRIP AT A ROLLING MILL OUTLET

FIELD OF THE INVENTION

The present invention relates to a roller guiding system for metal strips, specifically to a guiding system for thin metal strips exiting from a rolling plant.

STATE OF THE ART

In the hot rolling of ultra-thin metal strips, i.e. strips having a thickness lower than 1.5 mm, the best technique for reaching the predetermined thickness is that of endless rolling in which the deformation process of the strip occurs without interruption.

By applying such a rolling system for producing coils of strips, a flying shear which cut the strip when the wound coil reaches the expected dimensions is needed.

The cut is performed at the speed of the strip at the finishing mill outlet, at a speed generally either equal to or higher than 12 m/s. Disadvantageously, the high speed of the head of the strip and the thin thickness of the strip itself increase the possibility of head folding and cobbles.

The phenomenon which limits the maximum feeding speed of the strip on the roller table, making it unstable and increasing the likelihood of folding with consequently head tipping and cobbles, is generally of the aerodynamic type but may also be of the mechanical-aerodynamic type.

The distance between the rollers determines the bending of the head, due to the weight of the strip; therefore, when the head of the strip reaches the next roller, it is below the pass line.

If the angle, defined by the head of the strip with respect to the pass line, at which the strip impacts the roller is higher than a given limit, a collision derives that causes the head to rebound upwards also in virtue of the tangential component of the roller speed.

Therefore, after the collision, the head is fed at an angle with respect to the pass line equal to the angle at which it stroke against the roller.

If the lift force, which is generated by the surface of the strip which is fed inclined upwards with respect to the horizontal line, is higher than the weight force of the strip, this phenomenon is accentuated because the lifting surface increases, the lift grows and the strip is bent and tipped back on itself. Therefore, the mechanical aspect of the rebound of the strip head on the rollers contributes to and amplifies the take-off phenomenon of the head itself.

The importance of the phenomenon connected to the lift force increases according to the feeding speed of the strip on the roller table, with quadratic dependence, and according to the thinness of the strip which implies a decrease of weight of the strip itself.

The roller guiding systems for hot rolling mills include motorized roller tables, with centering guides which guide the head and the tail of the strip to a pinch roller or deflector roller which sends the head to the winding assembly, consisting of a winder provided with an appropriate number of winding rollers.

Some solutions for attempting to minimize and control the aforesaid problems belong to the known art.

For example, document JP5185128 describes a solution which provides to transversally stiffen the strip by making a corrugation thereof by means of two profiled rollers. Such a solution displays some disadvantages.

A first disadvantage is the generation of a permanent deformation in a part of the strip in proximity of the head implying a rejection of said part of the strip for each wound coil, because this part cannot meet the necessary quality requirements.

A second disadvantage is represented by the fact that the shape of the strip head thus obtained may cause cobbles when it encounters the pinch/deflector roller or the lead-in tables of the winding assembly.

Therefore, making a roller guiding system for feeding metal strips exiting from a rolling plant which allows to overcome the aforesaid drawbacks is needed.

SUMMARY OF THE INVENTION

It is the primary object of the present invention to make a roller guiding system for thin strips at a rolling plant outlet which allows to act on the mechanical-aerodynamic phenomenon which causes instability in the moving strip head, said guiding system being self-centering and therefore suitable for improving the winding quality of the coil itself.

Another object of the invention is to avoid that the strip, moving downwards, can impact onto the feeding rollers of the roller table underneath, getting damaged or cobbled and causing the interruption of the feeding of the strip itself towards the winding assembly.

A further object of the invention is to prevent the strip, moving upwards, from impacting or sliding on the upper containment devices avoiding possible damages to the surface, such as scratches or lines.

Moreover, a further object of the invention is to allow safe guiding without take-off and consequent tipping/folding of the head of the strip and without cobbles also at high feeding speeds.

The present invention, therefore, proposes to achieve the above-discussed purposes and aforesaid objects by making a guiding system for a metal strip exiting from a rolling mill, defining a longitudinal feeding direction, which in accordance with claim 1 comprises at least one roller table, comprising a plurality of feeding rollers having at least in the central part thereof, in cross section to the feeding direction, a substantially curvilinear profile, wherein there are provided at least one lead-in and containment means of the strip, arranged on said at least one roller table and provided with a blowing system of a fluid which is suitable to issue jets of fluid onto the moving strip in order to deform the strip on said feeding rollers so that the strip displays, in cross section with respect to the feeding direction, a profile corresponding to that of said rollers, and wherein there are provided guiding tables, arranged between the feeding rollers of at least one roller table, in order to support the head of the strip and minimize the possible instabilities when the head passes on said feeding rollers. Advantageously, the guiding system of the invention may be applied both to hot rolling mills with endless process, e.g. provided with two to four winders at the outlet, and to traditional hot rolling mills, comprising the roller table at the last hot rolling stand outlet, e.g. provided with one to four winders at the outlet. Furthermore, the system may be applied also for guiding heads in the outlet sections of continuous cold rolling mills.

A further advantage is obtaining a safe lead-in of thin and ultra-thin strips when these encounter the pinch/deflector roller or the lead-in tables of the winding assembly, provided between the deflector roller and the winder.

The invention aims to achieve the aforesaid objectives by:
- stiffening the strip by increasing the moment of inertia of the cross section of the moving head on the roller table; such an action is obtained by means of the action of jets of air, gas or water perpendicularly directed or inclined with a perpendicular component to the strip, and possibly by effect of a mechanical deformation with the pinch and stiffening rollers, possibly shaped in an appropriate manner, at the flying shear outlet;
- eliminating/decreasing the lifting effect of the strip due to the impacts of the head against the feeding rollers of the roller table;
- eliminating/decreasing the aerodynamic lift effect by creating a stream of air or gas at a speed lower than, equal to, or higher than that of the strip head which is fed on the roller table; by using a possible equidirectional fluid stream with respect to the strip;
- creating an integrated system in which each equipment which composes the outlet section of the hot rolling mill contributes to the objective related to a safe introduction of the ultra-thin strips;
- using a system of appropriately shaped rollers which, in addition to promoting the stiffening, allows to make a self-centering system for the moving strip;
- making an automation system which allows the synchronized control of the single equipments which form the outlet section of the hot rolling mill.

The dependent claims describe preferred embodiments of the invention.

BRIEF DESCRIPTION OF THE DRAWINGS

Further features and advantages of the present invention will be more apparent in the light of the detailed description of a preferred, but not exclusive, embodiments of a guiding system illustrated by way of non-limitative example, with the aid of the accompanying drawings, wherein:

FIG. 7b shows a diagram of the action of the jets on the strip in FIG. 7a;

DETAILED DESCRIPTION OF PREFERRED EMBODIMENTS OF THE INVENTION

Figure 1:
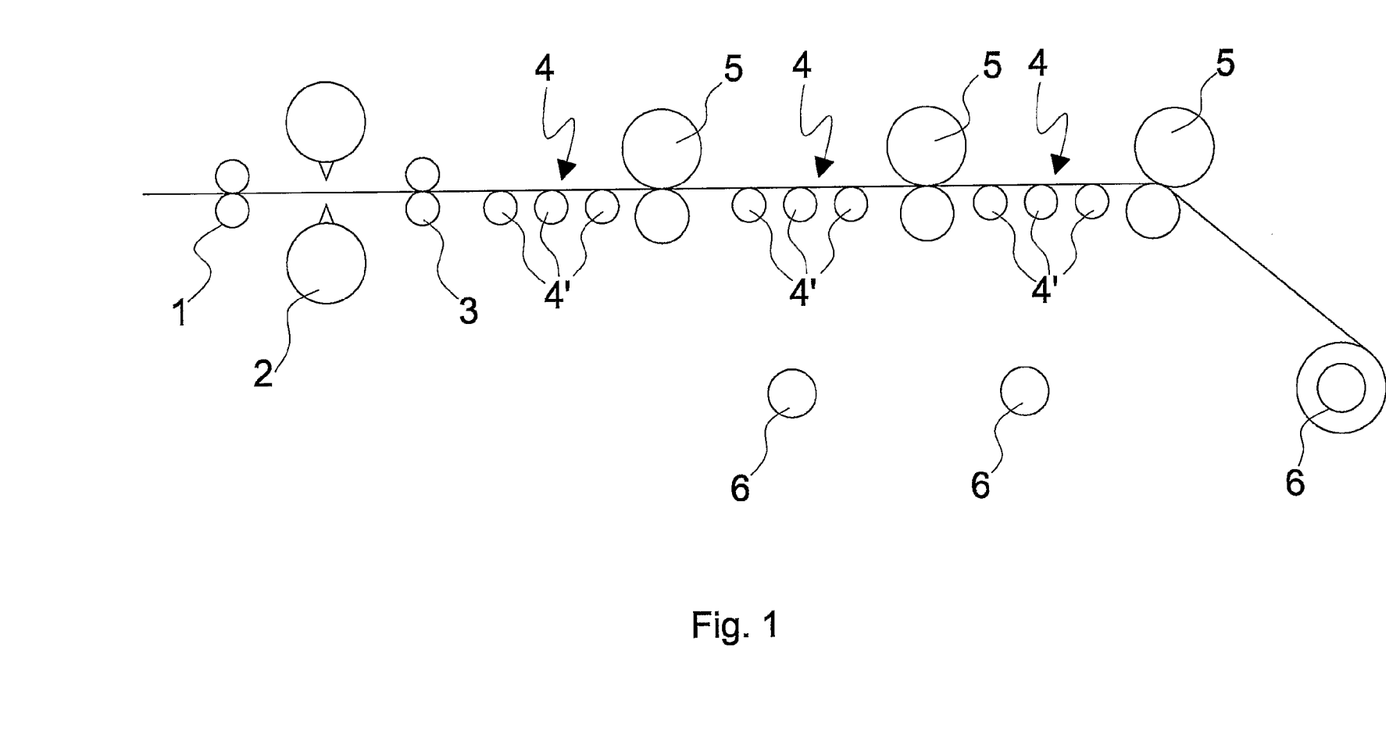
FIG. 1 shows a diagrammatic side view of an outlet section of an endless hot rolling plant without guiding system of the strip head.

FIG. 1 shows a roller guiding system for thin or ultra-thin metal strips 20 exiting from a hot rolling mill, either endless or of the traditional type, comprising:
- a flying shear 2 for cutting the strip;
- a pair of pinch rolls 1, arranged at the finishing mill outlet, and upstream of the shear 2, suitable for drawing the head of the strip after the cut;
- a pair of pinch and stiffening rollers 3 of the strip;
- at least one motorized roller table 4, comprising a plurality of feeding rollers 4' of the strip towards at least one winding section of the strip;
- a possible pair of pinch and deflector rollers 5 at the end of said at least one roller table 4;
- at least one winder 6, provided with at least one winding roller, at each pair of pinch/deflector rollers 5.

Figure 3:
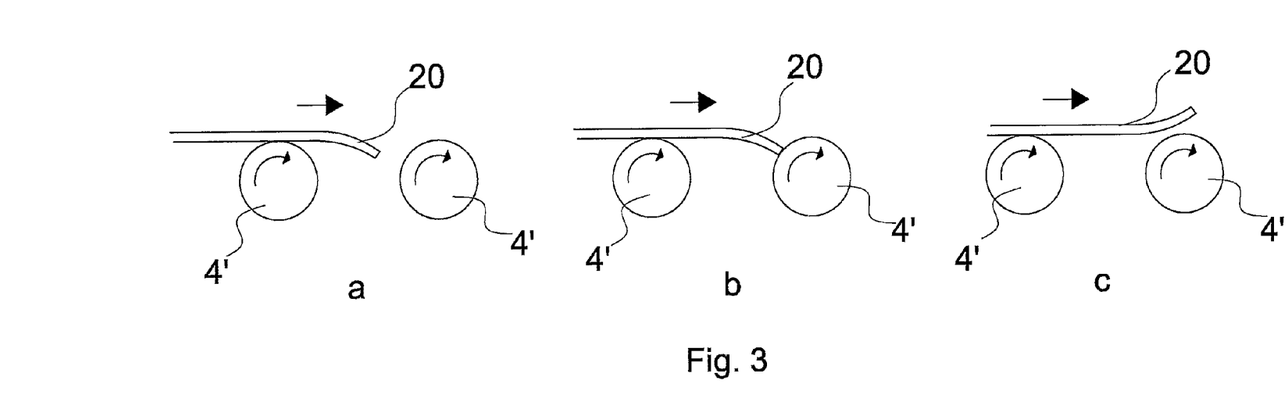
FIG. 3 shows a feeding diagram of a strip along a guiding system of the known art.

FIG. 3 diagrammatically shows the strip moving along a roller guiding system of the known art and shows the effect of instability due to the collision (FIG. 3(b)) of the head of the strip on a roller 4' in a point underneath the pass line of the strip either by effect of the weight of the strip itself or due to the deformation of the head by rolling or cutting. FIG. 3(c) shows the lifting effect of the head upon the rebound of the same after the collision.

Figure 2:
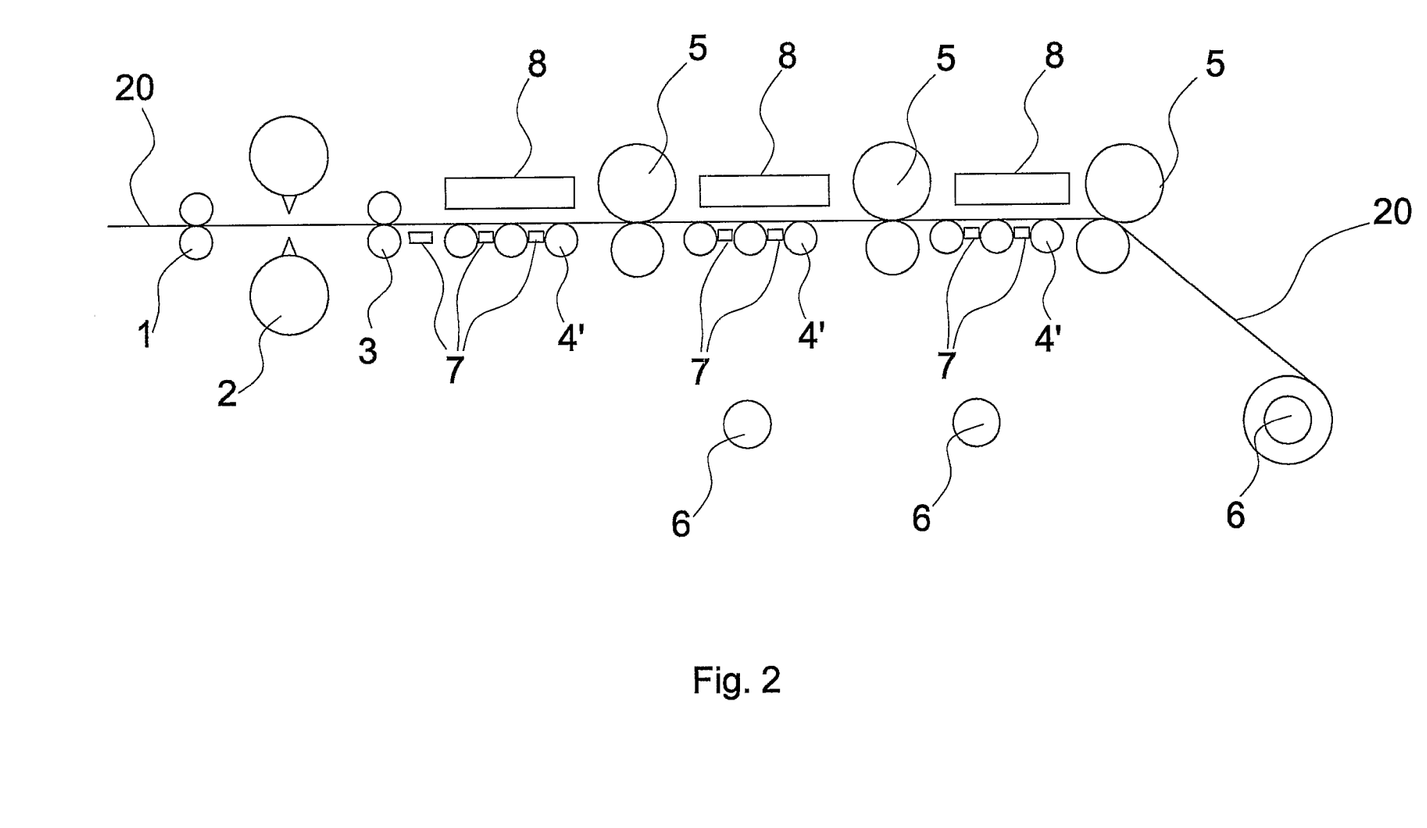
FIG. 2 shows a diagrammatic side view of an outlet section of an endless hot rolling plant provided with the guiding system of the strip head according to the invention.

The guiding system, object of the present invention, advantageously includes an lead-in and containment device 8, provided with an air or gas blowing system arranged over the roller tables 4, and guiding tables 7, arranged between the feeding rollers 4' of said roller tables 4, for supporting the head of the strip and minimizing the possible instability upon the passage of the head on the feeding roller. Containment device 8 and guiding tables 7 are shown in FIG. 2.

Figure 7A:
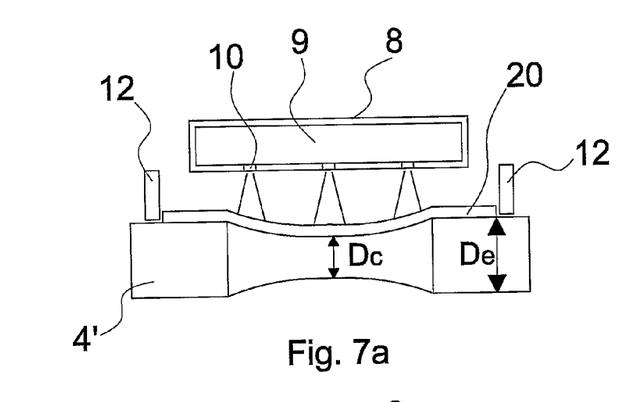
FIG. 7a shows a cross section of the segment of the system in FIG. 6.

Side containment guides 12 of the strip may also be provided between the roller tables 4 and the corresponding upper lead-in and containment devices 8 (FIG. 7a). The lower guiding tables 7 are provided between the feeding rollers 4' on each of the roller tables 4. In a variant, they may be provided either only between the rollers 4' of the first roller table 4, arranged after the pair of pinch and stiffening rollers 3, or directly after the shear 2 if the pair of rollers 3 is not provided, or alternatively only between the rollers 4' of the first and second roller tables, because the deformation of the strip and the maintenance of the obtained shape is such not to determine the above-described instability effect. In another variant, the guiding tables 7 may be provided in an alternating manner on the roller tables 4.

Figure 4:
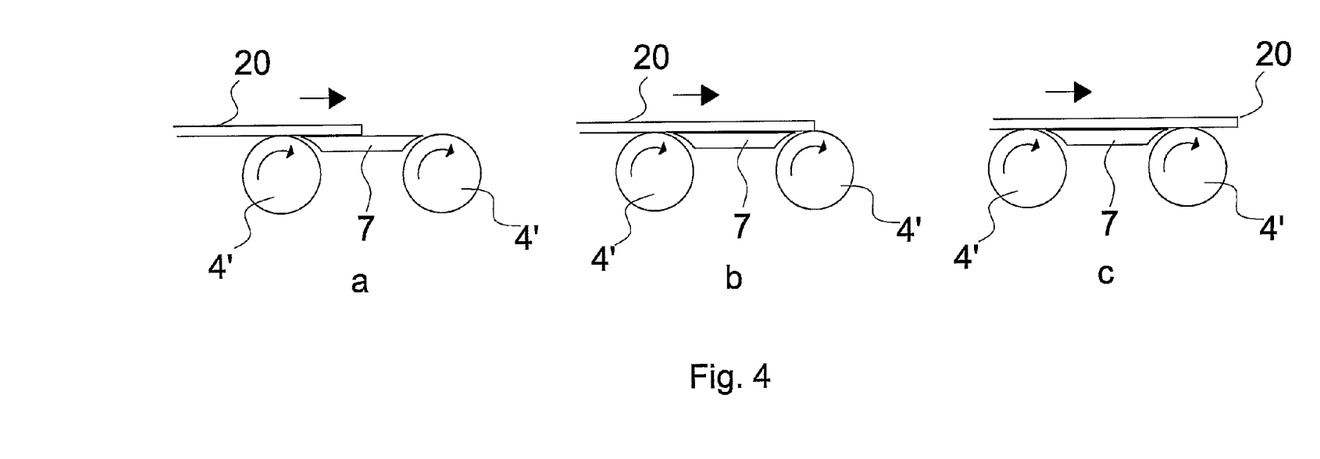
FIG. 4 shows a feeding diagram of a strip along a guiding system according to the invention.

FIG. 4 diagrammatically illustrates the strip moving along a guiding system according to the invention in which a considerable reduction of the instability due to the collisions of the strip head on the feeding rollers 4' is found, in virtue of the lower guiding tables 7.

The pinch rolls 1, upstream of the shear 2, are closed before the flying cutting operation producing the head of the strip to be wound.

At the moment of the cut, the containment device 8 and the attached air or gas blowing system are already positioned over the roller tables 4. The pinch and deflector rollers 5 are already in the position suitable to allow the passage of the tail of the previous strip and the subsequent lead-in of the head of the next strip, and the winders 6, provided with corresponding winding rollers, are ready to receive the head of the strip.

At the same time as or after the cut, the pinch and stiffening rollers 3, arranged at the outlet of the flying shear 2, are closed by applying a closing force F1 on the strip. A control system of the closing force F1 is advantageously provided such as to control the deformation of the strip in relation to different thicknesses/widths machined by the plant.

Figure 5:
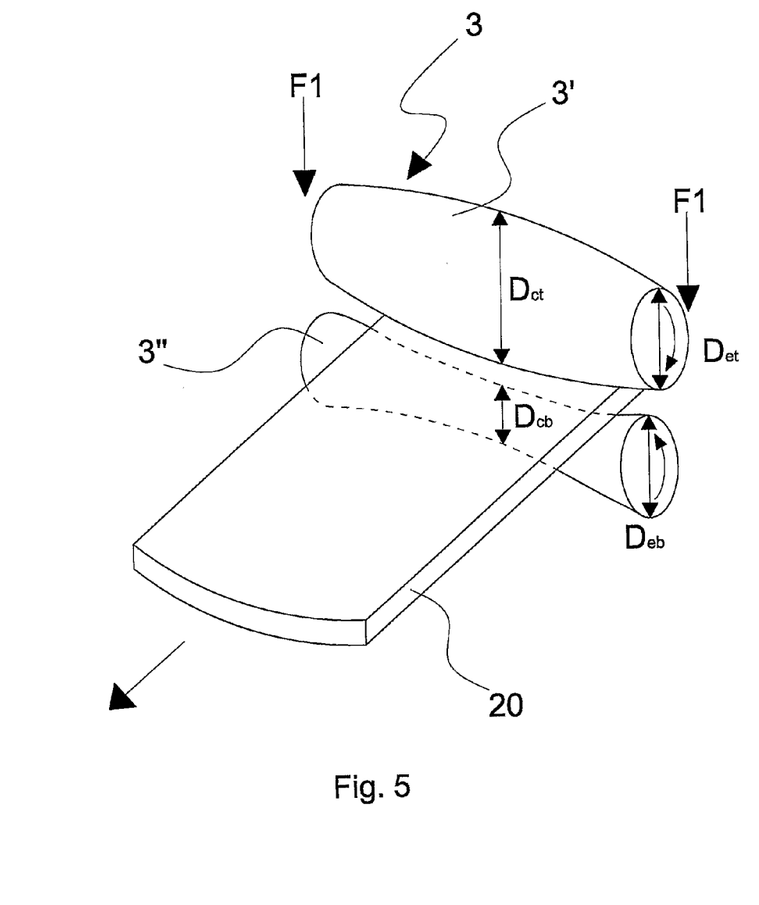
FIG. 5 shows a perspective view of a component of the system of the invention.

The pinch and stiffening rollers 3 may be advantageously shaped so as to obtain a deformation of the strip which confers a concave or convex shape to the strip, e.g. a canoe-shape or a tile-shape, according to whether the male profile is made on the upper roller 3' or on the lower roller 3". In FIG. 5, the configuration of the rollers 3', 3" determines a canoe-shaped strip.

A canoe-shape is obtained if the diameter $D_{cb}$ at the centre of the lower roller 3" (FIG. 5a) is smaller than the diameter $D_{eb}$ at the ends and if the diameter $D_{ct}$ at the centre of the upper roller 3' is larger than the diameter $D_{et}$ at the ends; vice versa, a tile-shape is obtained.

Figure 5A:
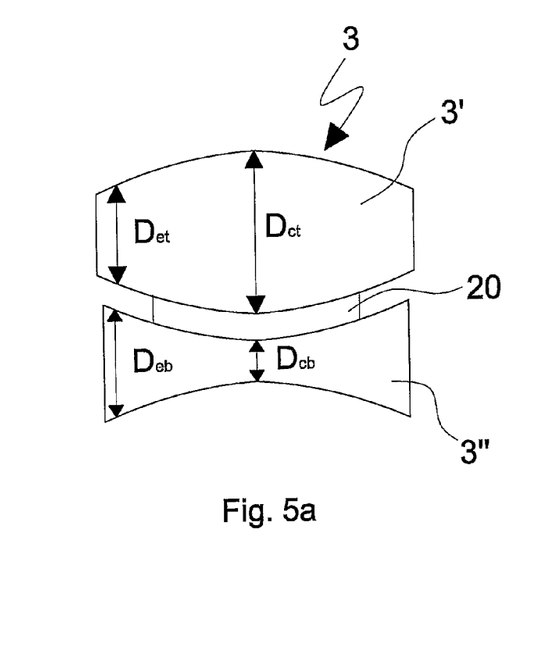
FIG. 5a shows a front view of the component in FIG. 5.

The shape obtained by means of the rollers 3', 3" allows an increase of the moment of inertia of the cross section of the strip, making it stiffer and thus less subject to the head lifting and overturning phenomena. Considering, for example, a "deflection" of the roller 3", i.e. the distance between the straight line parallel to the axis of the roller 3" which joins two end points of the roller itself and the vertex of the curvilinear profile thereof, equal to 5 mm, a moment of inertia of the cross section of the strip is obtained, which is approximately 43 times higher than when a pair of cylindrical pinch rolls is used. Therefore, a strip 0.8 mm thick which is curved and guided by means of the guiding system of the invention displays a stiffness equivalent to that of a non-curved strip 2.8 mm thick. This was found for a width of the strip equal to 1235 mm.

The head of the strip is fed on the roller table 4 along which, in the spaces between the feeding rollers, the guiding tables 7 are positioned so as to support the head of the strip, eliminating the bending effect of the same due to the force of gravity.

Advantageously, the feeding or support rollers 4' of the roller table 4 are appropriate shaped so as to obtain, by means of the blowing of pressurized air, gas or water from the top, a non-permanent deformation of the strip in the field of elasticity which confers either a concave, or canoe, shape or a convex, or tile, shape to the strip.

In the case in which the pair of pinch and stiffening roller 3 is provided, the feeding rollers 4' display a shape corresponding to that of the lower pinch and stiffening roller 3" at least in the central part thereof, so as to allow to maintain the canoe- or tile-shape.

The canoe-shape is obtained when the diameter $D_c$ at the centre of the rollers 4' (FIG. 7a, 7b, 7c) is smaller than the diameter $D_e$ at the ends, vice versa a tile-shape will be obtained.

If a canoe-shape is chosen, the rollers 4' are shaped so that the central part has an substantially concave cross profile and has a width smaller than the minimum width of the strip 20. In this case, the edges of the strip lay on the ends of the rollers 4' having a flat cross profile.

On the other hand, if a tile-shape is chosen (not shown), the central part of the rollers 4' has an substantially flat cross profile with a width smaller than the minimum width of the strip. In this case, the edges of the strip lay on the ends of the rollers 4' having an substantially truncated cone cross profile. Alternatively, the central part of the rollers 4' has an substantially convex, curvilinear cross profile. In the feeding direction of the strip, i.e. in a longitudinal direction, the profile of the upper surface of the guiding tables 7 may be rectilinear (FIG. 4) or appropriately shaped so as to reduce the possible strip/roller impact angle under the critical value. In this second case, the profile of the upper surface of the tables 7 at the longitudinal edges may be either curvilinear, with a radius of curvature from 1 mm to 10000 mm, or may consist of a broken line of straight lines, or of a combination of sinusoidal profiles. Specifically, such a profile may consist of a combination of polynomial curves with degree from 1 to 13.

Advantageously, the profile of the guiding tables 7 is conjugated in the cross direction, i.e. in a direction perpendicular to the feeding direction of the strip, to the profile of the feeding rollers 4' thus minimising possible instabilities upon the passage of the strip head on said rollers 4'. For example, the central profile of the tables 7 in the cross direction may be correlated with the central profile of the rollers 4' in FIG. 7a.

The cross width of the guiding tables 7 is either equal to or slightly higher than the width of the central part of the strip and, however, is smaller than the minimum width of the strip. Said tables 7 are fixed at the ends of a side structure of the guiding system.

The lead-in and containment device 8 is positioned over each roller table 4. Such a device 8 comprises a lead-in table adapted to create a mechanical lead-in for the head of the moving strip. This lead-in table advantageously is provided with a pressurized chamber 9 therein, in which air or gas is maintained at a given pressure, preferably varying from 0.1 to 6 bar.

The lead-in table is positioned at a predetermined distance from the pass line and may preferably vary from 15 to 150 mm.

The air or gas is released from the pressurized chamber 9 through appropriately shaped holes or nozzles.

Advantageously, the deformation of the strip for the stiffening thereof may be obtained also without providing the pair of pinch and stiffening rollers 3, but simply by effect of the air or gas jets. The jets, at an appropriate fluid pressure, push the strip onto the feeding rollers 4' deforming it so that this displays a profile corresponding to the profile of said rollers 4', in the cross section with respect to the feeding direction.

Figure 6:
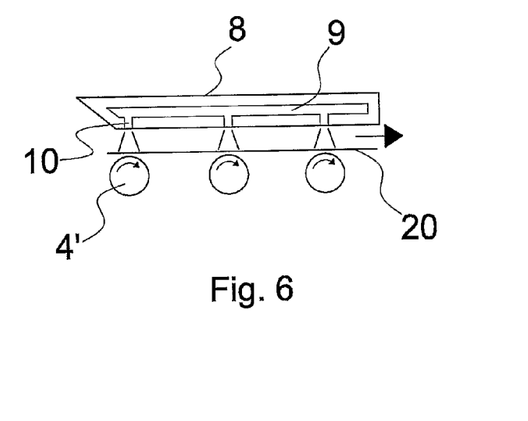
FIG. 6 shows a longitudinal section of a segment of a guiding system according to the invention.
Figure 7B:
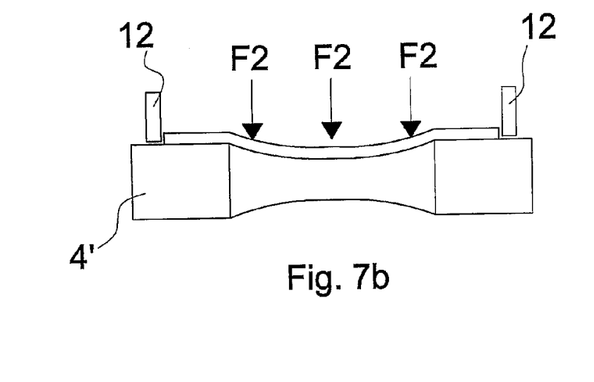

In a first embodiment, the chamber 9, made for example of welded steel plate, is provided with holes advantageously arranged at the feeding or support rollers 4'. Such holes or nozzles have an axis perpendicular to the plane defined by the pass line of the strip (holes 10, FIG. 6), or inclined at a predetermined angle preferably of approximately 10-45° (holes 11, FIG. 8) with respect to the plane, so that the air or gas jets may exert a force F2 which has at least one component perpendicular to the axes of the feeding rollers 4'. The force F2 or the component thereof which is perpendicular to the axes of the rollers 4' is able to adhere the strip to the rollers 4'. The thrust of the jets causes and/or maintains the curvature of the strip that adapts itself to the profile of the feeding rollers 4', as shown in FIG. 7a. In FIG. 7b, the action of the jets is indicated by means of the bending force F2 exerted on the strip.

Figure 8:
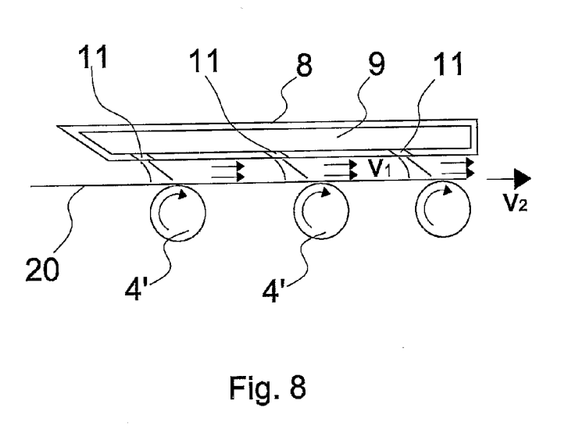
FIG. 8 shows a longitudinal section of a variant of the segment of the guiding system according to the invention.

In the case in FIG. 8, the air or gas jets which are inclined with respect to the strip advantageously produce an equidirectional flow with respect to the strip, guiding the head of the strip and maintaining the canoe- or tile-shaped profile. According to a variant, the action line of the oblique jets advantageously intersects the upper generatrix of the rollers 4'.

The speed of the equidirectional flow $v_1$ of air or gas may be higher than, smaller than or equal to the feeding speed $v_2$ of the strip.

Figure 9A:
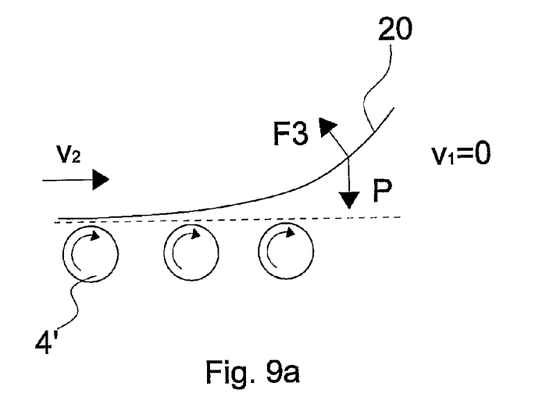
FIG. 9a shows a diagram of the forces acting on the moving strip when the variant in FIG. 6 is used.
Figure 9B:
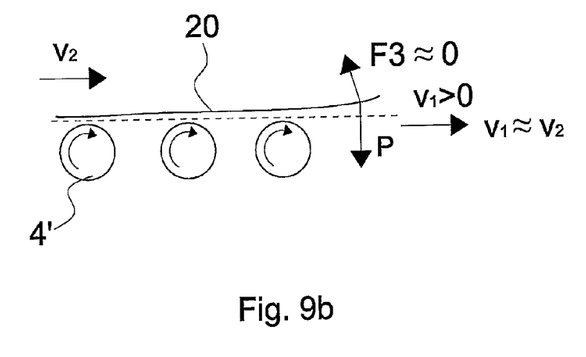
FIG. 9b shows a diagram of the forces acting on the moving strip when the variant in FIG. 8 is used.

The effect of the equidirectional flow of air or gas will be such to minimize the possible lift force F3, so that the gravity force P which acts on the head of the strip is always higher than the possible lift force F3, as diagrammatically shown in FIG. 9b where the speed of the equidirectional flow $v_1$ of air or gas is advantageously comparable to the feeding speed $v_2$ of the strip 20. In this case, indeed, the considerable reduction of the relative speed between air/gas and strip implies a consequent considerable reduction of the aerodynamic lift effects.

Figure 7C:
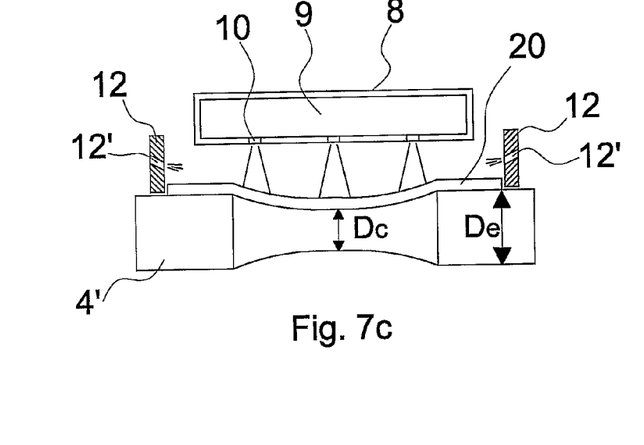
FIG. 7c shows a cross section of the segment of the system in FIG. 6 in an alternative variant.

According to a variant shown in FIG. 7c, the side containment guides 12 may advantageously include holes 12' through which jets of air or gas directed towards the central area of the space between the upper lead-in and containment device 8 and the surface of the moving strip may be issued. These further jets are slightly inclined downwards so as to partially contribute to the pressing force for deforming the strip and at the same time for optimizing the channeling of the aforesaid equidirectional flow preventing possible side leakages thereof.

FIG. 9a, instead, diagrammatically shows the case in which there is no equidirectional flow of air or gas, i.e. $v_1$ equal to zero and the lift force F3 is comparable to the force of gravity P in intensity, causing an upward lifting of the strip head.

Figure 10:
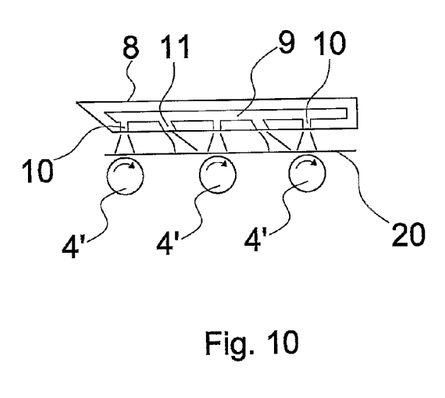
FIG. 10 shows a longitudinal section of a further variant of the segment of the guiding system according to the invention.

In a further embodiment, shown in FIG. 10, the pressurized chamber 9 which is made of welded steel plate for example, is provided with holes or nozzles, advantageously arranged both at the areas between the feeding rollers 4' and at the feeding rollers themselves.

Specifically, the holes or nozzles 10 at the rollers 4' have an axis perpendicular to the plane defined by the pass line of the strip, while the holes or nozzles 11 at the areas between the rollers 4' have an axis inclined by approximately 45° with respect to the aforesaid plane, or vice versa.

In each embodiment of the invention, a synchronizing system is advantageously provided for synchronizing the start-up of the air/gas flow to the pressurized chambers 9 of the lead-in and containment devices 8 with the start-up of the rotation of the drums of the flying shear 2.

A control system is also provided, which modulates the pressure of the air or gas entering the pressurized chambers 9 in relation to the dimensions, thickness and width of the strip being machined.

The gases used may have a density, at atmospheric pressure and temperature of 20° C., either higher or lower than the air density.

Alternatively, water jets may be used instead of the air or gas jets, specifically in the case of hot rolling mills.

The strip 20 at the end of each roller table 4 encounters a pair of pinch/deflector rollers 5. This pair of rollers 5 may have two working positions. The first working position provides the axes of the two rollers 5 arranged on corresponding planes perpendicular to the strip pass line and appropriately reciprocally spaced so as to divert the head of the strip towards the corresponding winder 6. The second working position provides the axes of the two rollers 5 arranged on a same plane perpendicular to the strip pass line, in the case in which the head of the strip needs to proceed towards a subsequent roller table and not towards a winder.

The invention claimed is:

1. A guiding system of a metal strip exiting from a rolling mill, defining a longitudinal feeding direction, comprising:
   at least one roller table, comprising a plurality of feeding rollers having at least in a central part thereof, in cross section to the feeding direction, a curvilinear profile, wherein there are provided
   at least one lead-in and containment means of the strip, arranged on said at least one roller table and provided with a blowing system of a fluid which is suitable to issue jets of fluid onto the moving strip in order to deform the strip on said feeding rollers so that the strip displays, in cross section with respect to the feeding direction, a profile corresponding to that of said feeding rollers,
   wherein there are provided guiding tables, arranged between the feeding rollers of at least one roller table, in order to support a head of the strip,
   wherein in order of said feeding direction, one or more pinch rolls, adapted to drag the head of the strip along said feeding direction are disposed prior to said at least one roller table, and
   wherein one of said pinch rolls comprises a pair of stiffening rollers for stiffening the strip, where the lower roller has, in cross section to the feeding direction, a profile corresponding to that of at least the central part of the feeding rollers, said stiffening rollers being suitable to deform the strip so that it displays, in cross section to the feeding direction, the aforesaid curvilinear profile, and
   wherein along a cross direction with respect to the feeding direction, an upper surface of the guiding tables has a curvilinear profile, at least in a central part thereof, conjugated to the profile of the feeding rollers in order to further minimize instabilities upon the passage of the strip head on said feeding rollers.

2. A system according to claim 1, wherein said blowing system of a fluid comprises a pressurization chamber provided with holes or nozzles at the feeding rollers having a perpendicular axis with respect to the feeding direction.

3. A system according to claim 1, wherein said blowing system of a fluid comprises a pressurization chamber provided with holes or nozzles at the feeding rollers having an axis inclined by a predetermined angle with respect to the feeding direction so as to generate an equidirectional flow of the fluid in order to minimize the aerodynamic lift effect.

4. A system according to claim 2, wherein further holes or nozzles may be provided at the distance between centres of the feeding rollers, said further holes or nozzles having an axis inclined by a predetermined angle with respect to the feeding direction.

5. A system according to claim 3, wherein further holes or nozzles may be provided at the distance between centres of the feeding rollers, said further holes or nozzles having an axis perpendicular with respect to the feeding direction.

6. A system according to claim 3, wherein said predetermined angle is variable between 10 and 45°.

7. A system according to claim 1, wherein along the feeding direction an upper surface of the guiding tables has a shaped profile so as to mitigate impact of the strip at an angle on the roller.

8. A system according to claim 7, wherein said shaped profile of the upper surface of the guiding tables is curvilinear, with radius of curvature from 1 mm to 10000 mm, a broken line of straight lines, a combination of sinusoidal profiles or a combination of polynomial curves with degree from 1 to 13.

9. A system according to claim 1, wherein there are provided control means for controlling a closing force of the pair of stiffening rollers.

10. A system according to claim 2, wherein there is provided a flying shear, prior to said at least one roller table, for cutting segments of strip of predetermined length, and there are provided synchronizing means for synchronizing the start-up of the fluid flow to the pressurization chamber with the start-up of the rotation of the drums of said flying shear.

11. A system according to claim 3, wherein there is provided a flying shear, prior to said at least one roller table, for cutting segments of strip of predetermined length, and there are provided synchronizing means for synchronizing the start-up of the fluid flow to the pressurization chamber with the start-up of the rotation of drums of said flying shear.

12. A system according to claim 10, wherein there are provided control means suitable for modulating the pressure of the fluid entering the pressurization chamber in relation to the dimensions of the strip being machined, said fluid being air, or gas, or water.

13. A system according to claim 11, wherein there are provided control means suitable for modulating the pressure of the fluid entering the pressurization chamber in relation to dimensions of the strip, said fluid being air, gas or water.

14. A system according to claim 1, wherein there are provided a plurality of roller tables, a plurality of pairs of pinch/deflector rollers, each pair being arranged downstream of a corresponding roller table, and winding means placed at each pair of pinch/deflector rollers.

15. A rolling plant comprising a rolling mill and a guiding system of a metal strip exiting from said rolling mill, the guiding system defining a longitudinal feeding direction and comprising:

at least one roller table, comprising a plurality of feeding rollers having at least in a central part thereof, in cross section to the feeding direction, a substantially curvilinear profile, wherein there are provided at least one lead-in and containment means of the strip, arranged on said at least one roller table and provided with a blowing system of a fluid which is suitable to issue jets of fluid onto the moving strip in order to deform the strip on said feeding rollers so that the strip displays, in cross section with respect to the feeding direction, a profile corresponding to that of said rollers, wherein there are provided guiding tables, arranged between the feeding rollers of at least one roller table, in order to support a head of the strip, wherein in order of said feeding direction, one or more pinch rolls, adapted to drag the head of the strip along said feeding direction, are disposed prior to said at least one roller table, wherein one of said pinch rolls comprises a pair of stiffening rollers for stiffening the strip, where the lower roller has, in cross section to the feeding direction, a profile corresponding to that of at least the central part of the feeding rollers, said stiffening rollers being suitable to deform the strip so that it displays, in cross section to the feeding direction, the aforesaid substantially curvilinear profile, and wherein along a cross direction with respect to the feeding direction, an upper surface of the guiding tables has a curvilinear profile, at least in a central part thereof, conjugated to the profile of the feeding rollers in order to further minimize instabilities upon the passage of the strip head on said feeding rollers.

* * * * *